US012633715B2

(12) United States Patent
Qin et al.

(10) Patent No.: US 12,633,715 B2
(45) Date of Patent: May 19, 2026

(54) OPTICAL FIBER RAW MATERIAL COMPOSITION, OPTICAL FIBER, AND OPTICAL FIBER PRODUCT

(71) Applicant: HUAWEI TECHNOLOGIES CO., LTD., Guangdong (CN)

(72) Inventors: Guanshi Qin, Changchun (CN); Zhixu Jia, Changchun (CN); Shengling Wu, Shenzhen (CN); Weiping Qin, Changchun (CN); Shiyi Cao, Shenzhen (CN); Zhiwu Chang, Shenzhen (CN); Ruishan Chen, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 475 days.

(21) Appl. No.: 18/309,980

(22) Filed: May 1, 2023

(65) Prior Publication Data

US 2023/0275388 A1 Aug. 31, 2023

Related U.S. Application Data

(63) Continuation of application No. PCT/CN2021/111331, filed on Aug. 6, 2021.

(30) Foreign Application Priority Data

Nov. 2, 2020 (CN) .......................... 202011205309.6

(51) Int. Cl.
| | |
|---|---|
| *H01S 3/06* | (2006.01) |
| *C03C 3/23* | (2006.01) |

(Continued)

(52) U.S. Cl.
CPC ............ *H01S 3/06716* (2013.01); *C03C 3/23* (2013.01); *C03C 13/048* (2013.01); (Continued)

(58) Field of Classification Search
CPC ..... H01S 3/06716; C03C 3/23; C03C 13/048; C03C 2213/00; C03B 37/01268; C03B 37/027

See application file for complete search history.

(56) References Cited

U.S. PATENT DOCUMENTS 5,251,062 A 10/1993 Snitzer et al.

FOREIGN PATENT DOCUMENTS

| CN | 1522979 A | 8/2004 |
|---|---|---|
| CN | 107244810 A | 10/2017 |

(Continued)

OTHER PUBLICATIONS

Agawane et al., High emission cross-section Er3+-doped fluorophosphate glasses for active device application, Optik— International Journal for Light and Electron Optics 198 (2019) 163228 (Year: 2019).*

(Continued)

*Primary Examiner* — Peter Radkowski

(57) ABSTRACT

The technology of this application relates to the field of communication technologies, and an optical fiber raw material composition, an optical fiber, and an optical fiber product. The optical fiber raw material composition includes components of the following molar percentages: $AlF_3$ 10%-50%, $BaF_2$ 3%-20%, $CaF_2$ 3%-20%, $YF_3$ 1%-15%, $SrF_2$ 3%-20%, $MgF_2$ 3%-20%, and $TeO_2$ 1%-35%. The optical fiber prepared by using the optical fiber raw material composition provided in this disclosure can be used in aspects such as a mid-infrared band transmission optical fiber, an optical fiber amplifier, a fiber laser, and an optical fiber sensor.

14 Claims, 6 Drawing Sheets

(51) Int. Cl.
| | |
|---|---|
| *C03C 13/04* | (2006.01) |
| *H01S 3/067* | (2006.01) |
| *C03B 37/012* | (2006.01) |
| *C03B 37/027* | (2006.01) |

(52) U.S. Cl.
CPC ...... *C03B 37/01268* (2013.01); *C03B 37/027* (2013.01); *C03C 2213/00* (2013.01)

(56) References Cited

FOREIGN PATENT DOCUMENTS

| | | |
|---|---|---|
| CN | 108598855 A | 9/2018 |
| JP | 2002141586 A | 5/2002 |

OTHER PUBLICATIONS

Aiso et al., Development of Er, Yb Co-Doped Fiber for High Power Optical Amplifier. Furukawa Review. 2001 (Year: 2001).*

Druon et al., "On Yb:CaF2 and Yb:SrF2: review of spectroscopic and thermal properties and their impact on femtosecond and high power laser performance [Invited]," Opt. Mater. Express 1, 489-502 (2011) (Year: 2011).*

Guo et al., Investigation on local structure surrounding erbium cations in fluoride glasses with TeO2 introduction for 2.7 mm emission, Journal of Alloys and Compounds 753 (2018) 502e507 (Year: 2018).*

Huang, F., Ma, Y., Li, W. et al. 2.7 μm emission of high thermally and chemically durable glasses based on AlF3. Sci Rep 4, 3607 (2014). https://doi.org/10.1038/srep03607 (Year: 2014).*

Huang et al., Origin of near to middle infrared luminescence and energy transfer process of Er31/Yb31co-doped fluorotellurite glasses under different excitations, under different excitations, 2015 (Year: 2015).*

Wang et al., Single-mode laser output in a Yb3+-doped fluorophosphate fiber, 1796 vol. 33, No. 9 / Sep. 2016 / Journal of the Optical Society of America B (Year: 2016).*

Tadashi Sakamoto, et al: "Wideband Rare-earth-doped Fiber Amplification Technologies—Gain Bandwidth Expansion in the C and L bands", Special Feature, NTT Technical Review, Dec. 2004, total 7 pages.

Wang Fengchao et al.: "The influence of TeO2 on thermal stability and 1.53 μm spectroscopic properties in Er3+ doped oxyfluoride glasses", Spectrochimica Acta Part A: Molecular and Biomolecular Spectroscopy, vol. 150, Nov. 1, 2015 (Nov. 1, 2015), 8 pages.

Extended European Search Report for EP Application No. 21884562.6 dated Mar. 13, 2024, 7 pages.

Shunbin Wang: "Preparation, characterization and applications of rare earth ions doped AlF3-TeO2 based glass fibers", Jun. 2, 2017, with English abstract total 99 pages.

Fengchao Wang: "The study of 2-3μm luminescent properties of rare-earth-doped fluoride tellurite glass", Jan. 2016, with English abstract total 76 pages.

* cited by examiner

OPTICAL FIBER RAW MATERIAL COMPOSITION, OPTICAL FIBER, AND OPTICAL FIBER PRODUCT

CROSS-REFERENCE TO RELATED APPLICATIONS

This application is a continuation of International Application No. PCT/CN2021/111331, filed on Aug. 6, 2021, which claims priority to Chinese Patent Application No. 202011205309.6, filed on Nov. 2, 2020. The disclosures of the aforementioned applications are hereby incorporated by reference in their entireties.

TECHNICAL FIELD

This disclosure relates to the field of communication technologies, and in particular, to an optical fiber raw material composition, an optical fiber, and an optical fiber product.

BACKGROUND

An optical fiber amplifier is a core component in a long-distance optical fiber communication system. A communication capacity of the optical fiber communication system is determined by an operating bandwidth of the optical fiber amplifier, and the operating bandwidth of the optical fiber amplifier is mainly limited by a gain bandwidth of an optical fiber. Currently, an erbium-doped fiber is widely used in the optical fiber amplifier.

A related technology provides an erbium-doped silicon fiber including an optical fiber core and optical fiber cladding. The optical fiber core is made up of components of the following molar percentages: $SiO_2$ 82%-97%, $GeO_2$ 2%-8%, $Er_2O_3$ 0.01-0.1%, and oxides of main group amphoteric elements 0.5-10%.

In a process of implementing this disclosure, the conventional approach has the following disadvantages:

The erbium-doped silicon fiber provided in the related technology has a narrow stimulated emission cross section, and an operating bandwidth cannot cover the entire L band (1565-1625 nm). In addition, the erbium-doped silicon fiber is prone to absorb moisture in the air, and consequently operating stability of the optical fiber is poor.

SUMMARY

This disclosure provides an optical fiber raw material composition, an optical fiber, and an optical fiber product, to resolve the foregoing technical problem.

Specifically, the following technical solutions are included.

According to one aspect, an embodiment of this disclosure provides an optical fiber raw material composition. The optical fiber raw material composition includes components of the following molar percentages: $AlF_3$ 10%-50%, $BaF_2$ 3%-20%, $CaF_2$ 3%-20%, $YF_3$ 1%-15%, $SrF_2$ 3%-20%, $MgF_2$ 3%-20%, and $TeO_2$ 1%-35%.

In some possible implementations, the optical fiber raw material composition is used to prepare an optical fiber core, and the optical fiber raw material composition further includes an Er ion.

In some possible implementations, a molar percentage of the Er ion in the optical fiber raw material composition is 0.01%-10%.

In some possible implementations, the optical fiber raw material composition further includes a Yb ion.

In some possible implementations, a molar percentage of a mixture of the Er ion and the Yb ion in the optical fiber raw material composition is 0.01%-10%.

According to another aspect, an embodiment of this disclosure provides an optical fiber. The optical fiber includes optical fiber cladding and an optical fiber core, and the optical fiber cladding is wrapped on the outside of the optical fiber core; and the optical fiber cladding is prepared by using the foregoing optical fiber raw material composition.

In some possible implementations, a numerical aperture of the optical fiber is 0.03-0.5.

In some possible implementations, a diameter of the optical fiber core is 1-20 μm.

In some possible implementations, the optical fiber core is prepared by using the optical fiber raw material composition in some of the foregoing implementations, and a refractive index of the optical fiber core is greater than a refractive index of the optical fiber cladding.

In some possible implementations, the optical fiber is a mid-infrared band transmission optical fiber.

According to still another aspect, an embodiment of this disclosure provides an optical fiber product. The optical fiber product includes an optical fiber, the optical fiber includes optical fiber cladding and an optical fiber core, and the optical fiber cladding is wrapped on the outside of the optical fiber core;

the optical fiber cladding is prepared by using a first optical fiber raw material composition, where the first optical fiber raw material composition includes components of the following molar percentages: $AlF_3$ 10%-50%, $BaF_2$ 3%-20%, $CaF_2$ 3%-20%, $YF_3$ 1%-15%, $SrF_2$ 3%-20%, $MgF_2$ 3%-20%, and $TeO_2$ 1%-35%; and the optical fiber core is prepared by using a second optical fiber raw material composition, where the second optical fiber raw material composition includes components of the following molar percentages: $AlF_3$ 10%-50%, $BaF_2$ 3%-20%, $CaF_2$ 3%-20%, $YF_3$ 1%-15%, $SrF_2$ 3%-20%, $MgF_2$ 3%-20%, and $TeO_2$ 1%-35% and an Er ion.

In some possible implementations, a molar percentage of the Er ion in the second optical fiber raw material composition is 0.01%-10%.

In some possible implementations, the second optical fiber raw material composition further includes a Yb ion.

In some possible implementations, a molar percentage of a mixture of the Er ion and the Yb ion in the second optical fiber raw material composition is 0.01%-10%.

In some possible implementations, a numerical aperture of the optical fiber is 0.03-0.5.

In some possible implementations, a diameter of the optical fiber core is 1-20 μm.

In some possible implementations, the optical fiber product includes an optical fiber amplifier, a fiber laser, and an optical fiber sensor.

Beneficial effect of the technical solutions provided in embodiments of this disclosure includes at least the following:

The optical fiber raw material composition provided in embodiments of this disclosure, based on cooperation of the foregoing components, not only can be used to prepare the optical fiber cladding, but also can be used to prepare the erbium-doped fiber core in cooperation with an erbium ion.

An optical fiber formed by the optical fiber cladding and the erbium-doped fiber core that are prepared has at least the following advantages:

(1) The optical fiber has a wide emission cross section, and when the optical fiber is used as a gain medium, a wide-band fiber amplifier with an operating bandwidth covering 15451627 nm can be obtained. (2) The optical fiber has a strong anti-deliquescence function, which can effectively improve a service life and stability of the optical fiber. (3) A refractive index of the optical fiber is close to that of a silicon fiber, and the optical fiber can implement a low-loss splice with the silicon fiber.

DESCRIPTION OF EMBODIMENTS

To make the technical solutions and advantages of this disclosure clearer, the following further describes the implementations of this disclosure in detail with reference to the accompanying drawings.

Optical fiber communication is an important transmission channel of social information. With rapid development of mobile Internet, Internet of Things (IoT), big data, cloud computing, and high-definition video, a communication capacity requirement of an optical fiber communication system is also increasing rapidly. An optical fiber amplifier is a core component in the optical fiber communication system. A communication capacity of the optical fiber communication system is determined by an operating bandwidth of the optical fiber amplifier.

Figures 1, 2:
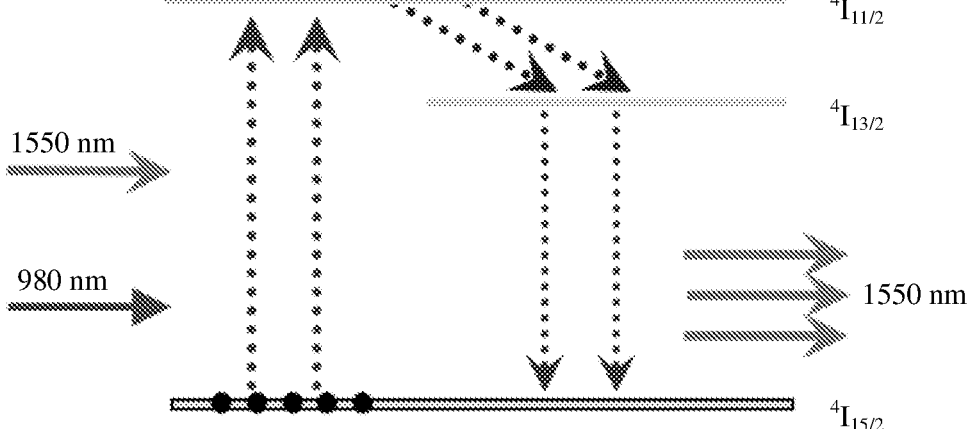
FIG. 1 is a schematic diagram of an example of a simplified energy level of an erbium ion according to an embodiment of this disclosure, where 1550 nm indicates signal light, and 980 nm indicates pump light.
FIG. 2 is a schematic diagram of a structure of an example of a single cladding fiber according to an embodiment of this disclosure.

An erbium-doped fiber amplifier (EDFA) is a widely used optical fiber amplifier in a C-band (1530-1565 nm) communication system. In the erbium-doped fiber amplifier, an erbium-doped fiber for amplification is spliced with a silicon fiber for transmission. In a stimulated radiation (an energy level transits from $^4I_{13/2}$ to $^4I_{15/2}$) process of erbium ions in the erbium-doped fiber, an optical signal is amplified. As shown in FIG. 1, a three-level structure model of a 980 nm pump is used as an example. An energy band $^4I_{15/2}$ is a ground state, an energy band $^4I_{13/2}$ is a metastable state, and an energy $^4I_{11/2}$ is an exciting state. When pump light (980 nm) is injected, erbium ions in the ground state $^4I_{15/2}$ are stimulated and absorbed and transit to the higher-energy exciting state $^4I_{11/2}$, and erbium ions in the exciting state immediately transit to the lower-energy metastable state $^4I_{13/2}$ without radiation. Because the erbium ions in the metastable state have a long life of about 10 ms in average, the erbium ions are aggregated in the metastable state until a quantity of aggregated erbium ions exceeds a quantity of erbium ions in the ground state, and a quantity of particles is reversed. In this case, when 1550 nm signal light is injected, stimulated radiation effect occurs when the 1550 nm signal light interacts with the erbium ions, and stimulated radiation of the erbium ion in the metastable state transits to the ground state, and a large quantity of photons that are totally the same as the signal photons are generated, so that the quantity of signal photons transmitted through the erbium-doped fiber increases rapidly, thereby generating signal amplification effect. Because the erbium ions in both the metastable state and the ground state have a specific width, the amplification effect of the erbium doped fiber amplifier has a specific wavelength range.

It can be seen that a gain bandwidth of the erbium-doped fiber determines the operating bandwidth of the erbium-doped fiber amplifier. Therefore, the gain bandwidth of the erbium-doped fiber is effectively improved. This is very important for the erbium-doped fiber amplifier that obtains a wider operating bandwidth. The erbium-doped silicon fiber provided in a related technology is made up of components of the following molar percentages: $SiO_2$ 82%-97%, $GeO_2$ 2%-8%, $Er_2O_3$ 0.01-0.10%, and oxides of main group amphoteric elements 0.5-10%. However, this type of erbium-doped silicon fiber has a narrow stimulated emission cross section, and an operating bandwidth cannot cover the entire L band (1565-1625 nm). In addition, the erbium-doped silicon fiber is prone to absorb moisture in the air, and consequently operating stability of the optical fiber is poor.

An embodiment of this disclosure provides an optical fiber raw material composition. The optical fiber raw material composition includes components of the following molar percentages: $AlF_3$ 10%-50%, $BaF_2$ 3%-20%, $CaF_2$ 3%-20%, $YF_3$ 1%-15%, $SrF_2$ 3%-20%, $MgF_2$ 3%-20%, and $TeO_2$ 1%-35%.

The optical fiber raw material composition provided in embodiments of this disclosure, based on cooperation of the foregoing components, not only can be used to prepare optical fiber cladding, but also can be used to prepare an erbium-doped fiber core in cooperation with an erbium ion. An optical fiber formed by the optical fiber cladding and the erbium-doped fiber core that are prepared has at least the following advantages: (1) The optical fiber has a wide emission cross section, and when the optical fiber is used as a gain medium, a wide-band fiber amplifier with an operating bandwidth covering 1545-1627 nm can be obtained. (2) The optical fiber has a strong anti-deliquescence function, which can effectively improve a service life and stability of the optical fiber. (3) A refractive index of the optical fiber is close to that of a silicon fiber, and the optical fiber can implement a low-loss splice with the silicon fiber.

The foregoing "deliquescence" can mean a phenomenon that some components in the optical fiber are prone to absorb moisture in the air, and consequently, these components in the optical fiber are dissolved in the water, and performance of the optical fiber is affected.

In the optical fiber raw material composition provided in this embodiment of this disclosure, a molar percentage of each component includes but is not limited to the following, and the following is separately described by using examples.

For example, a molar percentage of $AlF_3$ (aluminum fluoride) is 10%, 15%, 20%, 25%, 30%, 35%, 40%, 45%, 50%, or the like.

For example, a molar percentage of $BaF_2$ (barium fluoride) is 3%, 4%, 5%, 6%, 7%, 8%, 9%, 10%, 11%, 12%, 13%, 14%, 15%, 16%, 17%, 18%, 19%, 20%, or the like.

A molar percentage of $CaF_2$ (calcium fluoride) is 3%, 4%, 5%, 6%, 7%, 8%, 9%, 10%, 11%, 12%, 13%, 14%, 15%, 16%, 17%, 18%, 19%, 20%, or the like.

A molar percentage of $YF_3$ (yttrium fluoride) is 1%, 2%, 3%, 4%, 5%, 6%, 7%, 8%, 9%, 10%, 11%, 12%, 13%, 14%, 15%, or the like.

A molar percentage of $SrF_2$ (strontium fluoride) is 3%, 4%, 5%, 6%, 7%, 8%, 9%, 10%, 11%, 12%, 13%, 14%, 15%, 16%, 17%, 18%, 19%, 20%, or the like.

A molar percentage of $MgF_2$ (magnesium fluoride) is 3%, 4%, 5%, 6%, 7%, 8%, 9%, 10%, 11%, 12%, 13%, 14%, 15%, 16%, 17%, 18%, 19%, 20%, or the like.

A molar percentage of $TeO_2$ is 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, or the like.

In some possible Examples (1), the foregoing optical fiber raw material composition provided in this embodiment of this disclosure can be used to prepare the optical fiber cladding. To be specific, an embodiment of this disclosure provides an optical fiber raw material composition for optical fiber cladding, where the optical fiber raw material composition includes components of the following molar percentages: $AlF_3$ 10%-50%, $BaF_2$ 3%-20%, $CaF_2$ 3%-20%, $YF_3$ 1%-15%, $SrF_2$ 3%-20%, $MgF_2$ 3%-20%, and $TeO_2$ 1%-35%. When the optical fiber cladding is prepared, a sum of molar percentages of the foregoing components $AlF_3$, $BaF_2$, $CaF_2$, $YF_3$, $SrF_2$, $MgF_2$ and $TeO_2$ is 100%.

In some possible Examples (2), the foregoing optical fiber raw material composition provided in this embodiment of this disclosure can be used to prepare the optical fiber core. To be specific, an embodiment of this disclosure provides an optical fiber raw material composition for an optical fiber core, where the optical fiber raw material composition includes components of the following molar percentages: $AlF_3$ 10%-50%, $BaF_2$ 3%-20%, $CaF_2$ 3%-20%, $YF_3$ 1%-15%, $SrF_2$ 3%-20%, $MgF_2$ 3%-20%, and $TeO_2$ 1%-35%. When the optical fiber core is prepared, a sum of molar percentages of the foregoing components $AlF_3$, $BaF_2$, $CaF_2$, $YF_3$, $SrF_2$, $MgF_2$ and $TeO_2$ is 100%.

In some possible implementations, the optical fiber cladding is prepared by using the optical fiber raw material composition for the optical fiber cladding provided in Example (1); and the optical fiber core is prepared by using the optical fiber raw material composition for the optical fiber core provided in Example (2). In addition, the refractive index of the optical fiber core is greater than a refractive index of the optical fiber cladding, so that a transmission fiber can be obtained. The transmission fiber has a high transmission speed, good anti-deliquescence performance, and low-loss splice effect with the silicon fiber.

The optical fiber raw material composition provided in this embodiment of this disclosure can be further used to prepare the optical fiber core, and the optical fiber raw material composition further includes an Er ion (erbium ion), to amplify an optical signal by using stimulated radiation of the Er ion. For example, a molar percentage of the Er ion in the optical fiber raw material composition is 0.01%-10%, for example, 0.05%, 0.08%, 0.1%, 0.2%, 0.3%, 0.4%, 0.5%, 0.6%, 0.7%, 0.8%, 0.9%, 1%, 2%, 3%, 4%, 5%, 6%, 7%, 8%, or 9%.

In some possible implementations, the foregoing erbium-doped fiber raw material composition used to prepare the optical fiber core further includes a Yb ion (ytterbium ion). Amplification effect of the optical fiber can be improved by co-doping the Er ion and Yb ion.

A molar percentage of a mixture of the Er ion and the Yb ion in the optical fiber raw material composition is 0.01%-10%, for example, 0.05%, 0.08%, 0.1%, 0.2%, 0.3%, 0.4%, 0.5%, 0.6%, 0.7%, 0.8%, 0.9%, 1%, 2%, 3%, 4%, 5%, 6%, 7%, 8%, or 9%. In addition, in the mixture of the Er ion and the Yb ion, a molar ratio of the Er ion to the Yb ion includes but is not limited to 1:0.1-1.

In this embodiment of this disclosure, for example, the Er ion is mixed with other components in a manner of $ErF_3$ (erbium fluoride) or $Er_2O_3$ (erbium oxide), and the Yb ion is mixed with other components in a manner of $YbF_3$ (ytterbium fluoride) or $Yb_2O_3$ (ytterbium oxide).

In some possible Examples (3), to be specific, an embodiment of this disclosure provides an optical fiber raw material composition for an optical fiber core, where the optical fiber raw material composition includes components of the following molar percentages: $AlF_3$ 10%-50%, $BaF_2$ 3%-20%, $CaF_2$ 3%-20%, $YF_3$ 1%-15%, $SrF_2$ 3%-20%, $MgF_2$ 3%-20%, $TeO_2$ 1%-35%, and erbium dopant 0.01%-10%. The erbium dopant is a mixture of $ErF_3$ (erbium fluoride), $Er_2O_3$ (erbium oxide), and $ErF_3$ (erbium fluoride)+$YbF_3$ (ytterbium fluoride), or a mixture of $Er_2O_3$ (erbium oxide)+ $Yb_2O_3$ (ytterbium oxide).

The Er ion or the mixture of the Er ion and the Yb ion is doped into the optical fiber raw material composition provided in this embodiment of this disclosure. Other components included in the optical fiber raw material composition can change a local field environment around the erbium ion, increase a distribution range of the erbium ion in an exciting state with an energy level $^4I_{13/2}$, and broaden a corresponding stimulated radiation transition cross section.

The optical fiber cladding is prepared by using the optical fiber raw material composition for the optical fiber cladding provided in Example (1); and the optical fiber core is prepared by using the optical fiber raw material composition for the optical fiber core provided in Example (3). Based on the optical fiber cladding and the optical fiber core, an erbium-doped fiber with amplification effect can be obtained. Compared with a fluoride glass fiber, the erbium-doped fiber has better anti-deliquescence performance, and is not easy to absorb moisture in the air, to facilitate long-term operating stability. Compared with an erbium-doped silicon optical fiber, the prepared erbium-doped fiber has a larger emission cross section, and the erbium ion emission spectrum can cover the L band (1565-1625 nm), and has a wider gain spectrum in the L band. Compared with a conventional tellurium fiber, the prepared erbium-doped fiber has a refractive index similar to that of the silicon fiber, so that the optical fiber can implement a low-loss splice with the silicon fiber.

According to another aspect, an embodiment of this disclosure further provides an optical fiber. As shown in FIG. 2, the optical fiber includes optical fiber cladding 1 and an optical fiber core 2, where the optical fiber cladding 1 is wrapped on the outside of the optical fiber core 2. The optical fiber cladding 1 is prepared by using the foregoing optical fiber raw material composition provided in embodiments of this disclosure. The optical fiber raw material composition for the optical fiber cladding includes components of the following molar percentages: $AlF_3$ 10%-50%, $BaF_2$ 3%-20%, $CaF_2$ 3%-20%, $YF_3$ 1%-15%, $SrF_2$ 3%-20%, $MgF_2$ 3%-20%, and $TeO_2$ 1%-35%.

In some possible implementations, the optical fiber core 2 is prepared by using the foregoing optical fiber raw material composition provided in embodiments of this disclosure, and the optical fiber raw material composition for the optical fiber core 2 includes components of the following molar percentages: $AlF_3$ 10%-50%, $BaF_2$ 3%-20%, $CaF_2$ 3%-20%, $YF_3$ 1%-15%, $SrF_2$ 3%-20%, $MgF_2$ 3%-20%, and $TeO_2$ 1%-35%. In this implementation, molar percentages of components in the raw material compositions used by the optical fiber core 2 and the optical fiber cladding 1 are different. This ensures that a refractive index of the optical fiber core 2 is greater than a refractive index of the optical fiber cladding 1 and a transmission fiber is obtained. For example, the transmission fiber is a mid-infrared band transmission fiber.

In some other possible implementations, the optical fiber core 2 is prepared by using the optical fiber raw material composition having the erbium ion provided in embodiments of this disclosure, and the optical fiber raw material composition having the erbium ion includes components of the following molar percentages: $AlF_3$ 10%-50%, $BaF_2$ 3%-20% $CaF_2$, 3%-20%, $YF_3$ 1%-15%, $SrF_2$ 3%-20%, $MgF_2$ 3%-20%, $TeO_2$ 1%-35%, and erbium dopant 0.01%-10%. For example, the erbium dopant is a mixture of $ErF_3$ (erbium fluoride), $Er_2O_3$ (erbium oxide), $ErF_3$ (erbium fluoride)+$YbF_3$ (ytterbium fluoride), or a mixture of $Er_2O_3$ (erbium oxide)+$Yb_2O_3$ (ytterbium oxide). The optical fiber core 2 and the optical fiber cladding 1 can be used together to form an erbium-doped fiber, and the erbium-doped fiber can be used in an optical fiber amplifier or a fiber laser.

Compared with a fluoride glass fiber, the erbium-doped fiber provided in this embodiment of this disclosure has better anti-deliquescence performance, and the optical fiber is not easy to absorb moisture in the air, to facilitate long-term operating stability. Compared with an erbium-doped silicon optical fiber, the prepared erbium-doped fiber has a larger emission cross section, and an erbium ion emission spectrum can cover an L band (1565-1625 nm), and has a wider gain spectrum in the L band. Compared with a conventional tellurium fiber, the prepared erbium-doped fiber has a refractive index similar to that of the silicon fiber, so that the optical fiber can implement a low-loss splice with the silicon fiber.

The erbium-doped fiber has features such as a wide emission bandwidth and a high damage threshold. When the optical fiber is used as a gain medium, a wide-band fiber amplifier with an operating bandwidth covering 1545-1627 nm can be prepared. Compared with a Raman or semiconductor amplifier, the erbium-doped fiber amplifier has advantages such as lower pump power and lower noise figure.

Figure 3:
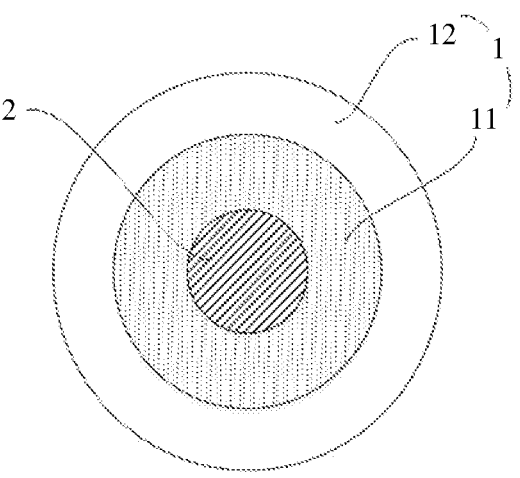
FIG. 3 is a schematic diagram of a structure of an example of a double cladding fiber according to an embodiment of this disclosure.

In some possible implementations, in any one of the foregoing optical fibers in embodiments of this disclosure, as shown in FIG. 2, the optical fiber cladding 1 may be single cladding. As shown in FIG. 3, the optical fiber cladding 1 may also be double cladding, that is, include inner cladding 11 and outer cladding 12. When the optical fiber cladding is the double cladding, both the inner cladding 11 and the outer cladding 12 may be prepared by using the optical fiber raw material composition for the optical fiber cladding provided in embodiments of this disclosure, and molar percentages of components included in the inner cladding 11 and the outer cladding 12 may be different; or only the inner cladding 11 is prepared by using the optical fiber raw material composition for the optical fiber cladding provided in embodiments of this disclosure.

Figure 4:
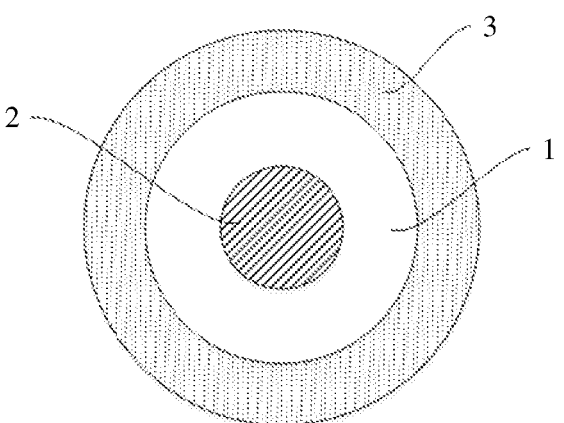
FIG. 4 is a schematic diagram of a structure of an example of an optical fiber with a coating according to an embodiment of this disclosure.

In some possible implementations, as shown in FIG. 4, the optical fiber provided in embodiments of this disclosure further includes a coating 3. The coating 3 is wrapped on the outside of the optical fiber cladding 1 for strengthening and buffering. This helps improve a service life of the optical fiber.

For example, the coating is prepared by using the following components of mass percentages: acrylate oligomer 50%-80%, photoinitiator 2%-8%, an additive 0.5%-5%, and a residual colorant. The acrylate oligomer includes: epoxy acrylate oligomer and/or polyurethane (methyl) acrylate oligomer, and the additive includes but is not limited to: defoamer, leveling agent, wetting agent, dispersant, polymerization inhibitor, and the like. The coating prepared by using the foregoing components has a lower elastic modulus and higher elongation at break, so that the optical fiber coating is more flexible.

In the optical fiber provided in embodiments of this disclosure, a diameter of an optical fiber core is 1-20 μm, for example, 1 μm, 5 μm, 7 μm, 10 μm, 12 μm, 15 μm, 18 μm, or 20 μm. The optical fiber corresponding to the optical fiber core within the foregoing diameter range is especially applicable to products such as a transmission optical fiber, an optical fiber amplifier, a fiber laser, and an optical fiber sensor.

Further, in the optical fiber provided in embodiments of this disclosure, a numerical aperture of the optical fiber is 0.03-0.5, for example, 0.05, 0.1, 0.15, 0.2, 0.25, 0.3, 0.35, or 0.4. The numerical aperture of the optical fiber is $NA=(n_1^2-n_2^2)^{1/2}$, where $n_1$ is the refractive index of the optical fiber core and $n_2$ is the refractive index of the cladding. In embodiments of this disclosure, the numerical aperture of the optical fiber falls within the foregoing range. This not only ensures that the optical fiber has a strong enough capability of receiving light, but also effectively controls mode distortion of the optical fiber, to obtain an appropriate operating bandwidth.

According to still another aspect, an embodiment of this disclosure further provides an optical fiber product, where the optical fiber product includes any one of the foregoing erbium-doped fibers, the erbium-doped fiber includes optical fiber cladding and an optical fiber core, and the optical fiber cladding is wrapped outside the optical fiber core.

The optical fiber cladding is prepared by using a first optical fiber raw material composition, where the first optical fiber raw material composition includes components of the following molar percentages: $AlF_3$ 10%-50%, $BaF_2$ 3%-20%, $CaF_2$ 3%-20%, $YF_3$ 1%-15%, $SrF_2$ 3%-20%, $MgF_2$ 3%-20%, and $TeO_2$ 1%-35%.

The optical fiber core is prepared by using a second optical fiber raw material composition, where the second optical fiber raw material composition includes components of the following molar percentages: $AlF_3$ 10%-50%, $BaF_2$ 3%-20%, $CaF_2$ 3%-20%, $YF_3$ 1%-15%, $SrF_2$ 3%-20%, $MgF_2$ 3%-20%, and $TeO_2$ 1%-35% and an Er ion.

In some possible implementations, a molar percentage of the Er ion in the second optical fiber raw material composition is 0.01%-10%, to amplify an optical signal by using stimulated radiation of the Er ion in the molar percentage.

In some possible implementations, the second optical fiber raw material composition further includes a Yb ion. For example, a molar percentage of a mixture of the Er ion and the Yb ion in the second optical fiber raw material composition is 0.01%-10%. Amplification effect of the optical fiber can be improved by co-doping the Er ion and Yb ion.

In some possible implementations, a numerical aperture of the optical fiber is 0.03-0.5, and the numerical aperture of the optical fiber falls within the foregoing range. This not only ensures that the optical fiber has a strong enough capability of receiving light, but also effectively controls mode distortion of the optical fiber, to obtain an appropriate operating bandwidth.

In some possible implementations, a diameter of the optical fiber core is 1-20 μm, and an optical fiber corresponding to the optical fiber core within the foregoing diameter range is especially applicable to optical fiber products such as an optical fiber amplifier, a fiber laser, and an optical fiber sensor.

For example, the optical fiber product includes but is not limited to an optical fiber amplifier, a fiber laser, and an optical fiber sensor.

Figure 5:
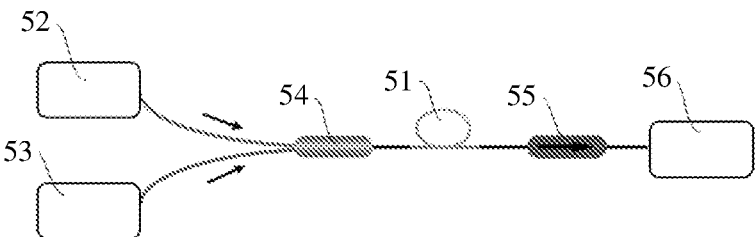
FIG. 5 is a schematic diagram of a structure of an example of an optical fiber amplifier according to an embodiment of this disclosure.

In some possible implementations, as shown in FIG. 5, the optical fiber amplifier includes: a gain fiber 51, a pump source 52, a signal source 53, a coupler 54, and an isolator 55, where the pump source 52 and the signal source 53 are connected to the coupler 54 through a silicon transmission fiber, and the coupler 54, the gain fiber 51, and the isolator 55 are sequentially connected through the silicon transmission fiber. The gain fiber 51 is an erbium-doped fiber provided in this embodiment of this disclosure, and is spliced with a silicon fiber. The pump source 52 is configured to provide energy required for inversion of a quantity of erbium ion particles, for example, a 1480 nm Raman fiber laser. The coupler 54 is also referred to as an optical wavelength division multiplexer, and is configured to combine pump light and signal light. The isolator 55 is configured to suppress adverse effect caused by backward amplification of spontaneous radiation and other reflection. An output spectrum and power output by the gain fiber 51 are monitored by an optical analyzer 56, such as an optical spectrum analyzer or an optical power meter. Further, in order to obtain a wide and flat gain curve, the optical fiber amplifier may further include a filter, where the filter is connected to the isolator 55 through the silicon transmission fiber, to flatten the gain curve.

A pumping manner of the optical fiber amplifier provided in this embodiment of this disclosure includes but is not limited to: co-directional pumping, reverse pumping, bidirectional pumping, and the like. For the co-directional pumping, the pump light and the signal light are injected into the erbium-doped fiber from the same end. For the reverse pumping, the pump light and the signal light are input into the erbium-doped fiber from different directions, and the pump light and the signal light are transmitted in the erbium-doped fiber reversely. For the bidirectional pumping, advantages of the co-directional pumping and the reverse pumping are combined, so that the pump light is evenly distributed in the optical fiber.

Figure 6:
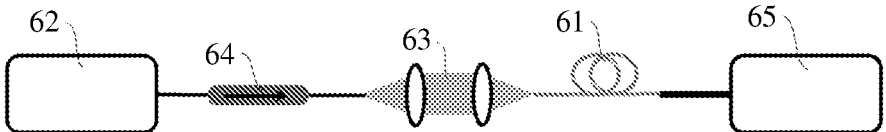
FIG. 6 is a schematic diagram of a structure of an example of a fiber laser according to an embodiment of this disclosure.

In some possible implementations, as shown in FIG. 6, the fiber laser includes: a gain fiber 61 (namely, the erbium-doped fiber provided in this embodiment of this disclosure), a pump source 62, a lens combination 63, and an isolator 64. The pump source 62, the isolator 64, the lens combination 63, and the gain fiber 61 are sequentially connected through a silicon transmission fiber, and the coupler, the gain fiber 61, and the isolator 64 are sequentially connected through the silicon transmission fiber. The pump source 62 is configured to provide energy required for inversion of a quantity of erbium ion particles, for example, a 1480 nm Raman fiber laser. The lens combination 63 is configured to couple pump light. The isolator 64 is configured to suppress adverse effect caused by backward amplification of spontaneous radiation and other reflection. An output spectrum and power output by the gain fiber 61 are monitored by an optical analyzer 65, such as an optical spectrum analyzer or an optical power meter.

According to yet another aspect, an embodiment of this disclosure further provides a preparation method of an optical fiber. The preparation method of the optical fiber includes: preparing the optical fiber by using the foregoing optical fiber raw material composition provided in embodiments of this disclosure.

For example, the preparation method includes: preparing a preform tube for optical fiber cladding by using an optical fiber raw material composition for optical fiber cladding; preparing a preform for an optical fiber core by using an optical fiber raw material composition for an optical fiber core; and preparing the optical fiber through a rod-in-tube technique by using the preform tube for the optical fiber cladding and the preform for the optical fiber core.

The following describes an example of an operation process of preparing a single cladding fiber through the rod-in-tube technique.

(1) Specific compositions of the raw material compositions for preparing the fiber core and cladding are determined separately, mass of each component is calculated based on a molar percentage of each component, each component of a specific mass is selected based on the mass of each component, and each component is mixed and ground evenly to form a mixture for preparing a fiber core and a mixture for preparing cladding.

(2) A preform for a fiber core is prepared by using the mixture for preparing the fiber core, including: The ground mixture for preparing the fiber core is put into a crucible, melted in an electric furnace at 900° C.-1100° C., and clarified for 20-30 minutes after being completely melted. Then, the melting liquid is injected into the preheated fiber core mold, and transferred to a muffle furnace that has been preheated to 350-450° C., for example, 400° C., for 2-5 hours, for example, 3 hours. After the insulation is complete, temperature slows down to a room temperature.

(3) A cladding tube is prepared by using the mixture for preparing the cladding, including: The ground mixture for preparing the cladding is put into a crucible, melted in the electric furnace at 900-1100° C., and clarified for 50-80 minutes after being completely melted. Then, the melting liquid is injected into the preheated cladding mold for rotation operating, after high-speed rotation, a hollowed-out cladding tube is formed by using a centrifugal action, and then transferred to a muffle furnace that has been preheated to 350° C.-450° C., for example, 400° C., for 2-5 hours, for example, 3 hours, and then temperature slows down to the room temperature.

(4) Surface polishing was performed on the preform for the fiber core and a cladding tube to remove surface defects of the preform for the fiber core and the cladding tube.

(5) The preform for the fiber core is stretched to a specific diameter by using the optical fiber drawing tower, and then the preform for the fiber core is inserted into the cladding tube. Then, the optical fiber having a proper size is drawn by using the optical fiber drawing tower. Based on specific structural parameters of the optical fiber to be prepared, the optical fiber may be prepared in a manner of a plurality of times of stretching.

This disclosure is further described below by using specific embodiments.

Embodiment 1

Embodiment 1 provides a series of erbium-doped fibers. The erbium-doped fiber includes an optical fiber core and optical fiber cladding. For compositions of the optical fiber core and the optical fiber cladding, refer to Table 1 and Table 2. Proportions in each component in Table 1 and Table 2 are molar percentages.

furnace at 950° C., and clarified for 30 minutes after being completely melted. Then, the melting liquid is poured into the inner cladding tube, and is transferred to a muff furnace that has been preheated to 400° C. for 3 hours after cooling and molding. After the heat preservation is complete, temperature slows down to the room temperature to obtain a preform for a fiber core. A diameter of the preform for the fiber core is 10 mm.

(3) The ground cladding mixture is put into the 50 ml crucible, melted in the electric furnace at 950° C., and clarified for 70 minutes after being completely melted. Then, the melting liquid is injected into a preheated cladding mold in a rotating casting system, and a sealing cover is quickly covered. Rotation operating is performed. After rotating at a high speed for 1 minute, a hollowed-out outer cladding tube is formed by using the centrifugal action, and then transfer the tube to a tube-type electric furnace that has been preheated to 440° C. Rotating is kept at a low speed (20 rotations/minute), thermal insulation annealing is performed for 5 hours, and then temperature slows down to the room temperature to obtain an outer cladding tube with an outer diameter of 12 mm.

(4) Surface polishing was performed on the preform for the fiber core and an outer cladding tube to remove surface defects of the preform for the fiber core and the outer cladding tube.

TABLE 1

| | Components | AlF$_3$ (%) | BaF$_2$ (%) | CaF$_2$ (%) | YF$_3$ (%) | SrF$_2$ (%) | MgF$_2$ (%) | TeO$_2$ (%) | ErF$_3$ (%) |
|---|---|---|---|---|---|---|---|---|---|
| 1 | Fiber core | 30 | 8.5 | 17 | 12.1 | 8.5 | 8.5 | 15 | 0.4 |
| | Cladding | 31.5 | 9 | 18 | 13.5 | 9 | 9 | 10 | 0 |
| 2 | Fiber core | 35 | 10 | 20 | 14.95 | 10 | 10 | 0 | 0.05 |
| | Cladding | 34.25 | 9.75 | 19.3 | 14.3 | 9.7 | 9.7 | 3 | 0 |
| 3 | Fiber core | 33.3 | 9.5 | 19 | 14.1 | 9.5 | 9.5 | 5 | 0.1 |
| | Cladding | 32.45 | 9.25 | 18.7 | 13.9 | 9.35 | 9.35 | 7 | 0 |
| 4 | Fiber core | 32.1 | 9.2 | 18.3 | 13.75 | 9.2 | 9.2 | 8 | 0.25 |
| | Cladding | 31.8 | 9.1 | 18.1 | 13.5 | 9 | 9 | 9.5 | 0 |
| 5 | Fiber core | 28.7 | 8.5 | 16.5 | 12.4 | 8.3 | 8.3 | 17 | 0.3 |
| | Cladding | 28 | 8 | 16 | 12 | 8 | 8 | 20 | 0 |

TABLE 2

| | Components | AlF$_3$ | BaF$_2$ | CaF$_2$ | YF$_3$ | SrF$_2$ | MgF$_2$ | TeO$_2$ | ErF$_3$ | YbF$_3$ |
|---|---|---|---|---|---|---|---|---|---|---|
| 6 | Fiber core | 27.3 | 7.5 | 15.7 | 11.5 | 7.8 | 7.8 | 22 | 0.3 | 0.1 |
| | Cladding | 26.75 | 7 | 15 | 11.25 | 7.5 | 7.5 | 25 | 0 | 0 |

For preparation steps of the foregoing six erbium-doped fibers in Embodiment 1, refer to the following description.

(1) Mass of each component is determined based on the specific compositions of raw material compositions for preparing the fiber core and cladding in Table 1 and Table 2, each component is weighed based on the mass of the component, and each component is mixed and is ground in an agate mortar for 30 minutes, so that each component is evenly ground, and an optical fiber core mixture and a cladding mixture are obtained separately.

(2) The ground cladding mixture is put into a 50 ml crucible, melted in an electric furnace at 950° C., and clarified for 30 minutes after being completely melted. Then, melting liquid is injected into a preheated cladding mold, and the cladding mold is quickly lifted to let the uncooled melting liquid flow out of the mold from a lower opening to form an inner cladding tube. Then, the ground fiber core mixture is put into the 50 ml crucible, melted in the electric (5) The preform for the fiber core is secured to an optical fiber drawing tower via a preform fixture, and stretch the preform for the fiber core to an outer diameter of about 3 mm. Then, the prepared preform for the fiber core with the diameter of about 3 mm is put into the outer cladding tube, and then the preform for the fiber core and the outer cladding tube are secured on the optical fiber drawing tower by using the preform fixture to draw an optical fiber. This can prepare the erbium-doped optical fibers.

After testing, core diameters of the six erbium-doped fibers are 8 μm, and a numerical aperture of each fiber is between 0.25 and 0.3. For example, in an erbium-doped fiber in a sequence number 1, a core refractive index of an optical fiber core at 1.55 um is about 1.506, and a cladding refractive index of optical fiber cladding at 1.55 um is about 1.481. The refractive indexes are extremely close to a refractive index 1.45 of a silicon fiber. Therefore, the erbium-doped fiber provided in this embodiment of this disclosure can implement a low-loss splice with a silicon fiber.

Embodiment 2

Figure 7:
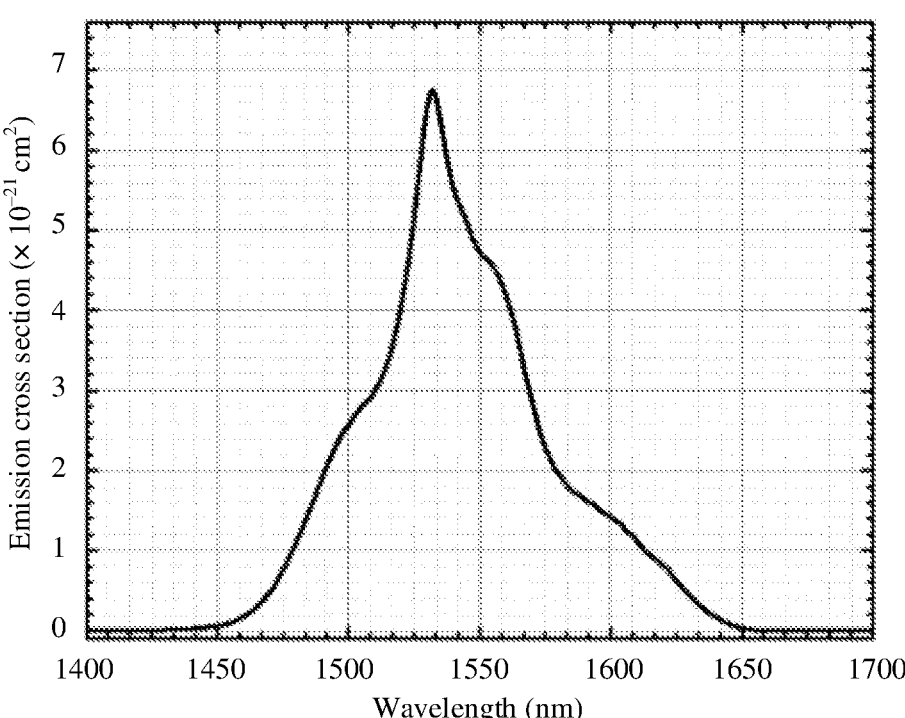
FIG. 7 is an example stimulated emission cross section curve of an erbium-doped fiber in a sequence number 1.
Figure 8:
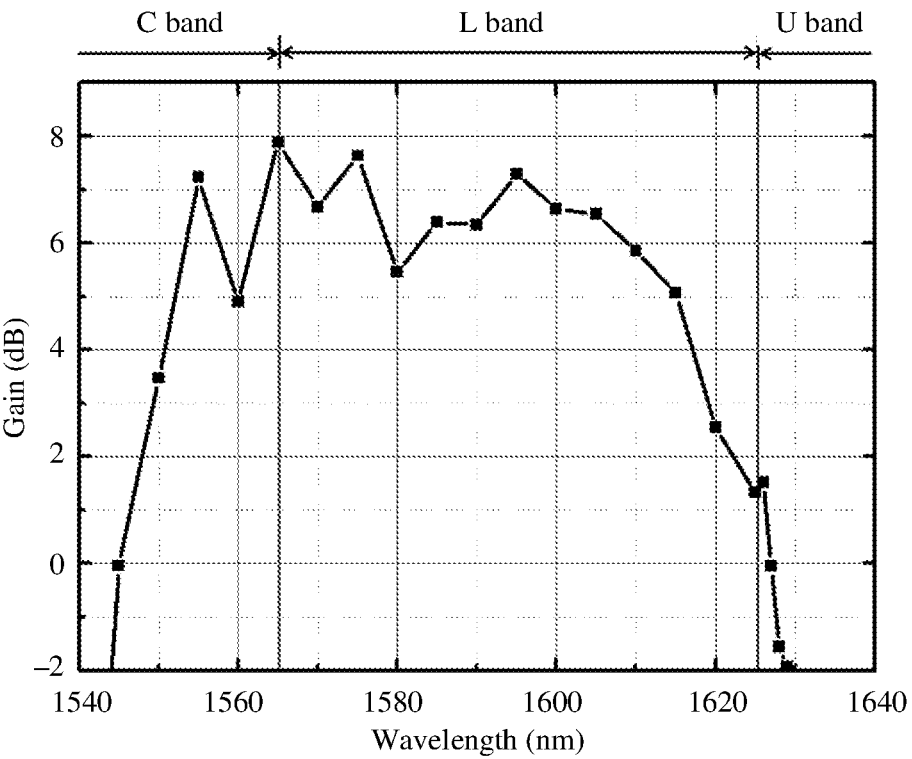
FIG. 8 is an example gain spectrum diagram of an optical fiber amplifier according to an embodiment of this disclosure, where a 1480 nm laser is used as a pump source, a 1-meter erbium-doped fiber is used as a gain medium, pump optical power is 80 mW, and signal optical power is 1 mW.

According to the Judd-Oflet theory, a stimulated emission cross section of the erbium-doped fiber in the sequence number 1 is determined. As shown in FIG. 7, the erbium-doped fiber in the sequence number 1 has a large stimulated emission cross section. This indicates that the erbium-doped fiber in the sequence number 1 can be used as a gain medium material of a wide-band optical fiber amplifier. Based on this, in Embodiment 2, the erbium-doped fiber with a length of 1 μm in the sequence number 1 is used in the optical fiber amplifier shown in FIG. 5, and a 1480 nm laser is used as a pump source. When pump power is 80 mW and signal optical power is 1 mW, a measured gain spectrum of the optical fiber amplifier covers 1545-1627 nm (referring to FIG. 8). This means that the gain spectrum of the optical fiber amplifier can cover an entire L band (1565-1625 nm) and a part of C band (1530-1565 nm), and has a wider gain spectrum.

Based on the same test process, the same test is performed on erbium-doped fibers in sequence numbers 2-6. A test result shows that stimulated emission cross sections of the erbium-doped fibers in the sequence numbers 2-6 are equivalent to that of the erbium-doped fibers in the sequence number 1, and the gain spectrum covering 1545-1627 nm can also be obtained.

Embodiment 3

In Embodiment 3, the erbium-doped fiber in the sequence number 1 is used as a gain fiber to prepare a fiber laser. A structure of the fiber laser is shown in FIG. 6. In the fiber laser, a pump source is a 1480 nm Raman fiber laser. An isolator ensures unidirectional transmission of light and prevents reverse light from damaging the pump source. Pump light is coupled into the erbium-doped fiber in the sequence number 1 through a lens group, and a final output spectrum and power are monitored by an optical spectrum analyzer. Because the refractive index of the erbium-doped fiber in the sequence number 1 is about 1.5, according to the Fresnel reflection formula, reflectivity of the erbium-doped fiber in the sequence number 1 is about 4%.

Figure 9:
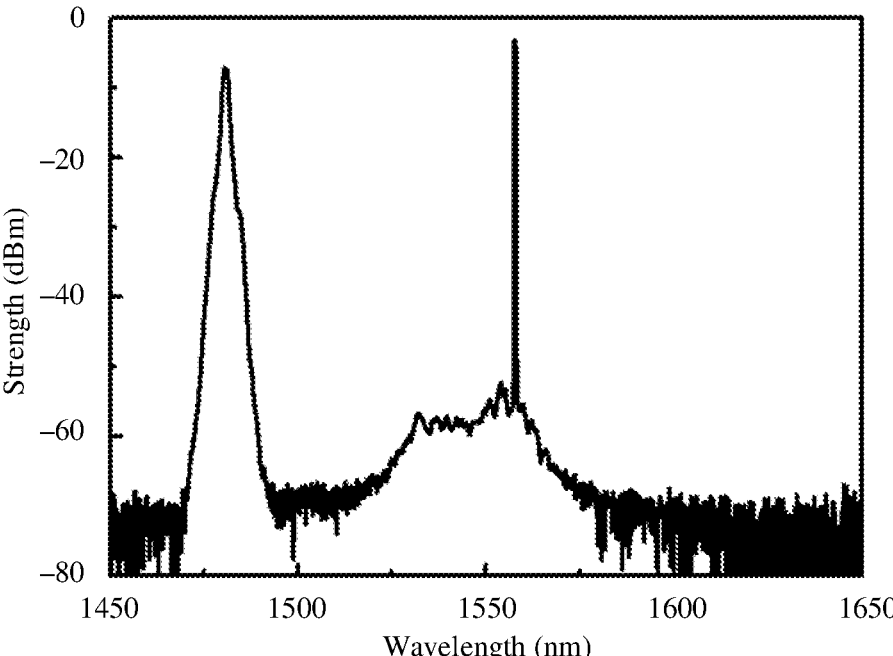
FIG. 9 is an example gain spectrum diagram of a fiber laser according to an embodiment of this disclosure, where a 1480 nm laser is used as a pump source, and a 0.3-meter erbium-doped fiber is used as a gain medium.
Figure 10:
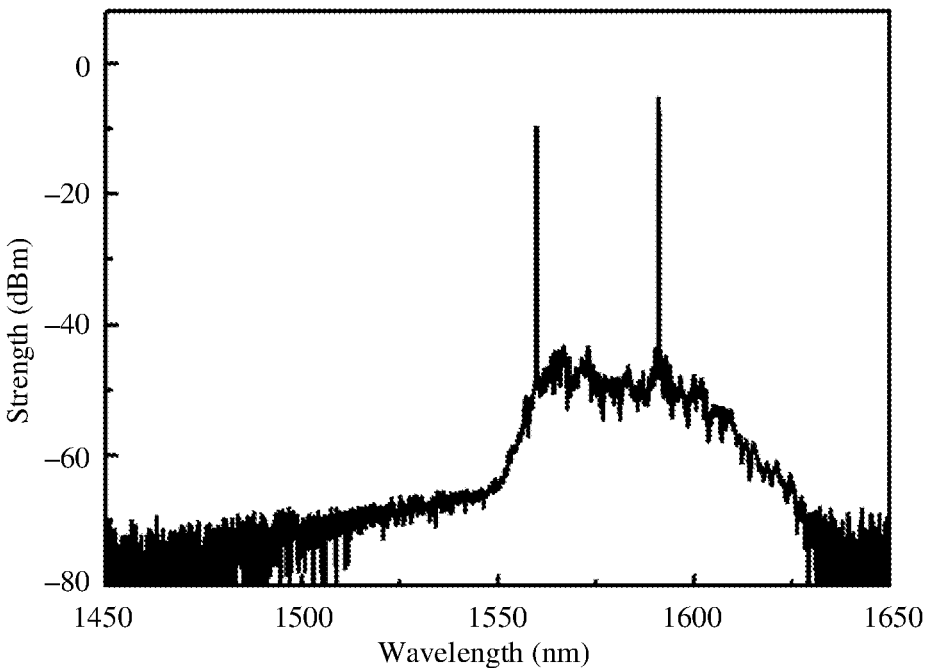
FIG. 10 is an example gain spectrum diagram of a fiber laser according to an embodiment of this disclosure, where a 1480 nm laser is used as a pump source, and a 3-meter erbium-doped fiber is used as a gain medium.

When a length of the gain fiber is 0.3 meter, as shown in FIG. 9, laser output with an operating wavelength of 1557 nm can be obtained. When the length of the gain fiber is 3 meters, as shown in FIG. 10, dual-wavelength laser output with operating wavelengths of 1560 nm and 1591 nm can be obtained.

Figure 11:
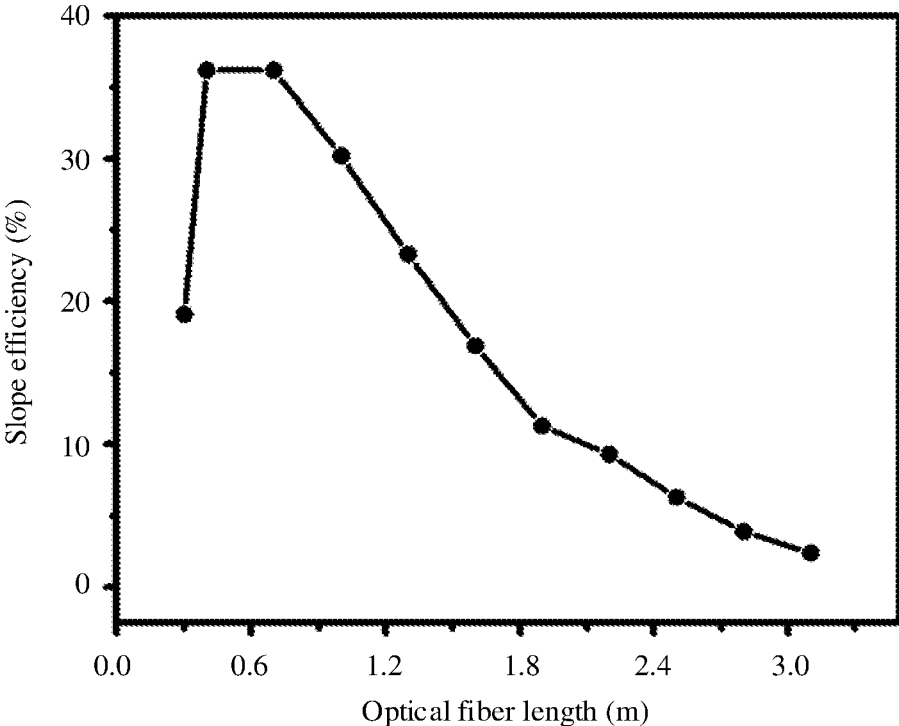
FIG. 11 is an example schematic diagram of a relationship between laser output slope efficiency of a fiber laser and a length of a gain fiber and pump laser power according to an embodiment of this disclosure.

After testing, by adjusting structure parameters of the fiber laser and introducing a tunable filter, the fiber laser can implement tunable laser output with a wavelength tuning range of 1560-1600 nm. FIG. 11 illustrates a change relationship between laser slope efficiency and the length of the gain fiber. As shown in FIG. 11, when the length of the gain fiber is 0.7 μm, the laser slope efficiency reaches a maximum value 36.2%. It can be learned that the erbium-doped fiber in the sequence number 1 in this disclosure may be used for an L-band broadband tunable laser.

Based on the same test process, the same test is performed on erbium-doped fibers in sequence numbers 2-6. The test result shows that laser outputs of the erbium-doped fibers in the sequence numbers 2-6 are equivalent to that of the erbium-doped fiber in the sequence number 1, and the L-band broadband tunable laser can also be obtained.

Embodiment 4

Figure 12:
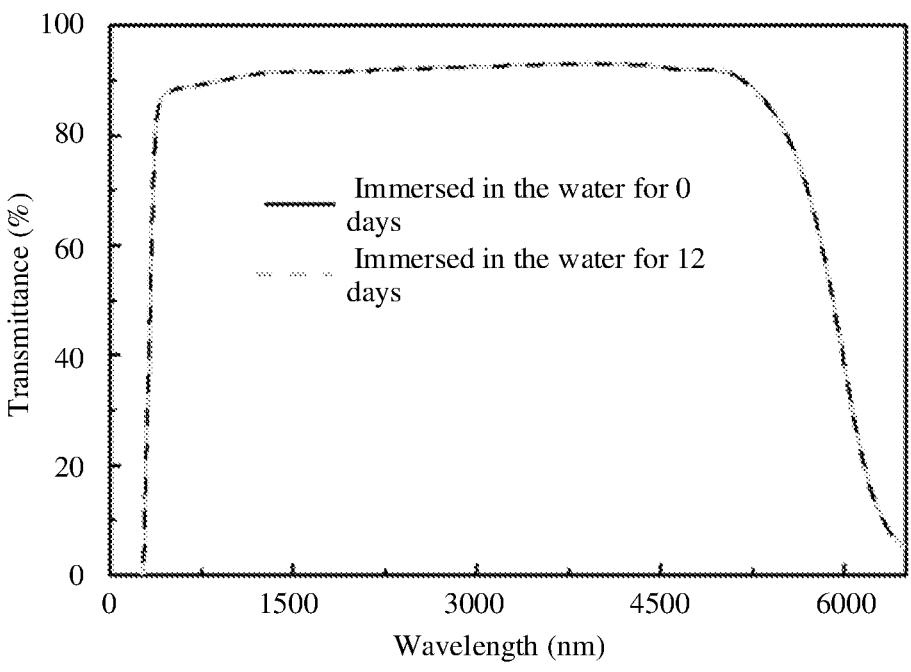
FIG. 12 is a transmittance spectrum diagram of an example of an erbium-doped fiber before and after water immersion processing according to an embodiment of this disclosure.

In Embodiment 4, an anti-deliquescence capability of the erbium-doped fiber in the sequence number 1 is tested, and a test process is as follows:

A transmittance spectrum of the erbium-doped fiber in the sequence number 1 is tested by using a spectrophotometer UV3600 and a Fourier spectrometer Nicolet 6700. A test result is shown in FIG. 12. It can be seen that a transmittance window of the erbium-doped fiber in the sequence number 1 ranges from 0.34 μm to 5.92 μm (a transmission rate >50%). Subsequently, the erbium-doped fiber in the sequence number 1 is immersed in the water, and is taken out and dried after being immersed in the water for 12 days. A transmittance spectrum of the dried erbium-doped fiber is tested in the same manner. As shown in FIG. 12, no obvious change is detected in the transmittance spectrum of the erbium-doped optical fiber in the sequence number 1 before and after the fiber is immersed in the water. In addition, no obvious change is detected in a weight of the erbium-doped optical fiber before and after the fiber is immersed in the water. It can be seen that the erbium-doped fiber in the sequence number 1 has better anti-deliquescence performance, that is, has better water-proof performance.

Based on the same test process, the same test is performed on erbium-doped fibers in sequence numbers 2-6. The test result shows that, similar to the erbium-doped fiber in the sequence number 1, the erbium-doped fibers in the sequence numbers 2-6 have better anti-deliquescence performance, and also have better water-proof performance.

Figure 13:
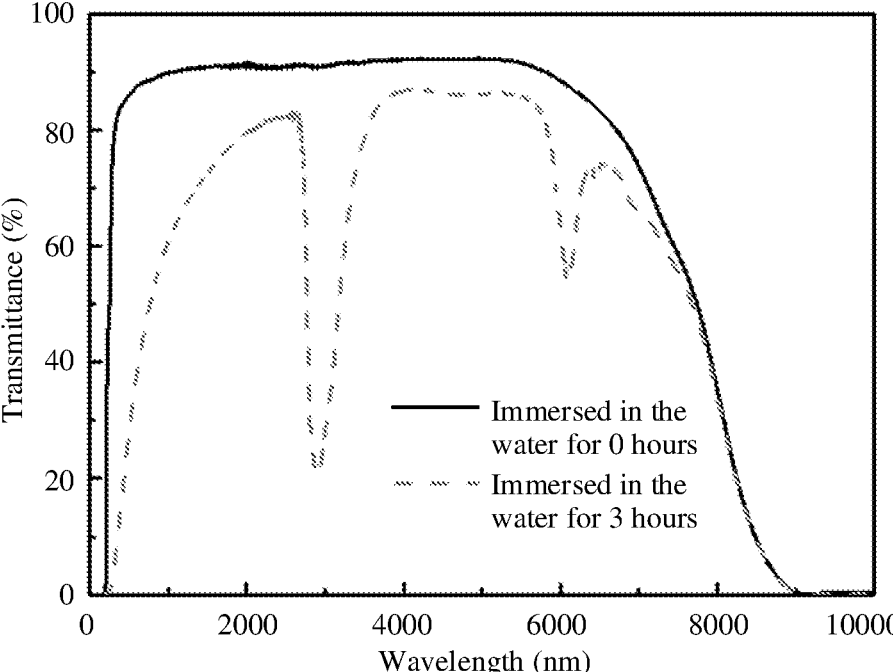
FIG. 13 is a transmittance spectrum diagram of an example of a commercial ZBLAN optical fiber before and after water immersion processing.

Further, as a comparison, a current commercial fluoride fiber $ZrF_4$—$BaF_2$—$LaF_3$—$AlF_3$—$NaF$ (ZBLAN) is immersed in the water, placed for 3 hours, and then taken out and dried. A transmittance spectrum of the commercial fluoride optical fiber is tested in the same manner. As shown in FIG. 13, a light transmittance after the fiber is immersed in the water is obviously worse than that before the fiber is immersed in the water. This indicates that the commercial fluoride optical fiber is not water-proof and deliquesces more easily. It can be learned that, compared with the conventional technology, the erbium-doped fiber provided in embodiments of this disclosure has greatly improved in anti-deliquescence.

The foregoing descriptions are merely intended to facilitate a person skilled in the art to understand the technical solutions of this disclosure, but are not intended to limit this disclosure. Any modification, equivalent replacement, or improvement made without departing from the spirit and principle of this disclosure shall fall within the protection scope of this disclosure.

What is claimed is:

1. An optical fiber, comprising:
optical fiber cladding; and
an optical fiber core, wherein
the optical fiber cladding is wrapped on the outside of the optical fiber core, and
the optical fiber cladding is prepared by using an optical fiber raw material composition comprising components of the following molar percentages: $AlF_3$ 10%-50%, $BaF_2$ 3%-20%, $CaF_2$ 3%-20%, $YF_3$ 1%-15%, $SrF_2$ 3%-20%, $MgF_2$ 3%-20%, and $TeO_2$ 1%-35%, with a sum of molar percentages of the components $AlF_3$, $BaF_2$, $CaF_2$, $YF_3$, $SrF_2$, $MgF_2$ and $TeO_2$ being 100%.

2. The optical fiber according to claim 1, wherein the optical fiber has a numerical aperture of 0.03-0.5.

3. The optical fiber according to claim 1, wherein the optical fiber core has a diameter of 1-20 μm.

4. The optical fiber according to claim 1, wherein the optical fiber core is prepared using the optical fiber raw material composition, and the optical fiber core has a refractive index greater than a refractive index of the optical fiber cladding.

5. The optical fiber according to claim 4, wherein the optical fiber is a mid-infrared band transmission optical fiber.

6. An optical fiber product, comprising:

an optical fiber, wherein the optical fiber includes optical fiber cladding and an optical fiber core, the optical fiber cladding is wrapped on the outside of the optical fiber core, the optical fiber cladding is prepared using an optical fiber raw material composition, wherein the optical fiber raw material composition comprises components of the following molar percentages: $AlF_3$ 10%-50%, $BaF_2$ 3%-20%, $CaF_2$ 3%-20%, $YF_3$ 1%-15%, $SrF_2$ 3%-20%, $MgF_2$ 3%-20%, and $TeO_2$ 1%-35%, with a sum of molar percentages of the components $AlF_3$, $BaF_2$, $CaF_2$, $YF_3$, $SrF_2$, $MgF_2$ and $TeO_2$ being 100%, and the optical fiber core is prepared using an erbium-doped optical fiber raw material composition comprising $AlF_3$ 10%-50%, $BaF_2$ 3%-20%, $CaF_2$ 3%-20%, $YF_3$ 1%-15%, $SrF_2$ 3%-20%, $MgF_2$ 3%-20%, and $TeO_2$ 1%-35%, and an Er ion, wherein the molar percentages of components in the optical fiber raw material composition for the optical fiber cladding are different from the corresponding molar percentages of components in the erbium-doped optical fiber raw material composition for the optical fiber core, and wherein the optical fiber core has a refractive index greater than that of the optical fiber cladding.

7. The optical fiber product according to claim 6, wherein the optical fiber has a numerical aperture of 0.03-0.5.

8. The optical fiber product according to claim 6, wherein the optical fiber core has a diameter of 1-20 μm.

9. The optical fiber product according to claim 6, further comprising:

an optical fiber amplifier;

a fiber laser; and an optical fiber sensor.

10. The optical fiber product according to claim 6, wherein the erbium-doped optical fiber raw material composition further comprises a Yb ion.

11. The optical fiber product according to claim 6, wherein the erbium-doped optical fiber raw material composition comprises $ErF_3$, $Er_2O_3$, a mixture of $ErF_3$ and $YbF_3$, or a mixture of $Er_2O_3$ and $Yb_2O_3$.

12. The optical fiber product according to claim 6, wherein the erbium-doped optical fiber raw material composition comprises the Er ion in a molar percentage of 0.01%-10%.

13. The optical fiber product according to claim 10, wherein the erbium-doped optical fiber raw material composition comprises the Er ion and Yb ion in a combined molar percentage of 0.01%-10%.

14. The optical fiber product according to claim 6, wherein the optical fiber is a mid-infrared band transmission optical fiber.

* * * * *